US 6,690,630 B1

(12) United States Patent
Hu (10) Patent No.: US 6,690,630 B1
(45) Date of Patent: Feb. 10, 2004

(54) COMPACT DISC DECODER AND METHOD FOR CORRECTING ADDRESS ERRORS IN HEADER DATA BASED ON AN INPUT ERROR FLAG

(75) Inventor: Shao-Chueh Hu, Taipei Hsien (TW)

(73) Assignee: MediaTek Inc., Hsin-Chu Hsien (TW)

( * ) Notice: Subject to any disclaimer, the term of this patent is extended or adjusted under 35 U.S.C. 154(b) by 20 days.

(21) Appl. No.: 10/064,630

(22) Filed: Jul. 31, 2002

(51) Int. Cl.[7] .................................................. G11B 7/00
(52) U.S. Cl. ................................. 369/47.22; 369/53.15
(58) Field of Search ......................... 369/47.22, 47.27, 369/47.31, 47.34, 53.15, 124.07

(56) References Cited

U.S. PATENT DOCUMENTS 5,388,093 A  *  2/1995  Yoshid et al. ................ 369/124

* cited by examiner

Primary Examiner—Nabil Hindi
(74) Attorney, Agent, or Firm—Winston Hsu (57) ABSTRACT

A method for using a compact disc decoder to correct a code error in digital data read out from a compact disc includes extracting address data out of at least one sector read from the compact disc, and using an error detection circuit to read a condition of an input error flag corresponding to the address data of the sector, wherein if the condition of the input error flag indicates that the address data contains an error, then the extracting circuit extracts address data of another sector. The method also includes when the input error flag indicates that no error is present in the address data of the sector, the sector is referred to as a first sector, and the selection circuit selects address data of the first sector without referring to address data of any sectors read before the first sector.

10 Claims, 12 Drawing Sheets

COMPACT DISC DECODER AND METHOD FOR CORRECTING ADDRESS ERRORS IN HEADER DATA BASED ON AN INPUT ERROR FLAG

BACKGROUND OF INVENTION

1. Field of the Invention

The present invention relates to a compact disc decoder, and more specifically, to a compact disc decoder that uses an input error flag to correct address errors in header data read from the compact disc.

2. Description of the Prior Art

Compact discs (CDs) are commonly produced using two formats: CD Read Only Memory (CD-ROM) and CD Digital Audio (CD-DA). In each of these formats, digital data is read off of the CD, and processed by a CD-ROM drive. In addition, CD-DA discs may also be played in an audio CD player. In U.S. Pat. No. 5,621,743 entitled "CD-ROM Decoder for Correcting Errors in Header Data", Tomisawa discloses a prior art CD-ROM decoder, which is included herein by reference.

Figure 1:
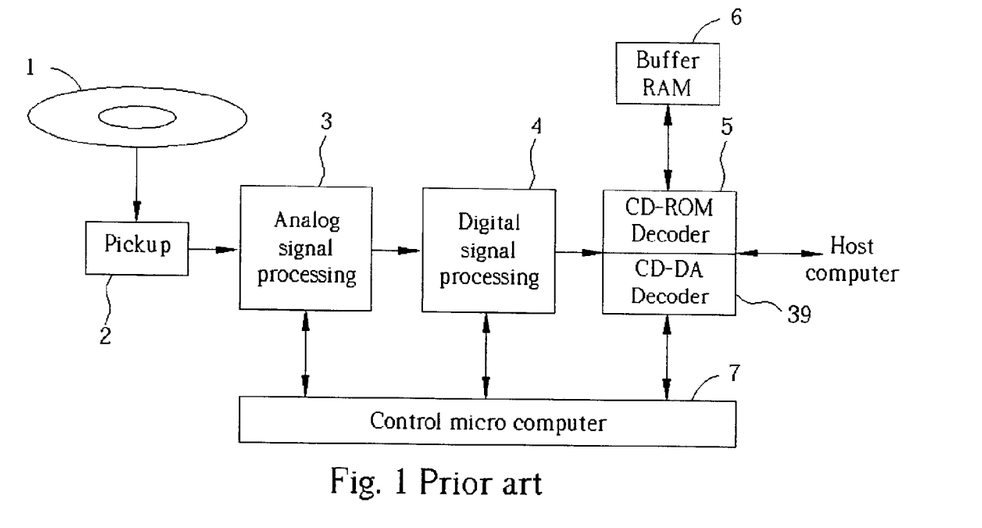
FIG. 1 is a functional block diagram of a CD drive that is capable of decoding CD-ROM and CD-DA discs according to the prior art.

Please refer to FIG. 1. FIG. 1 is a functional block diagram of a CD drive that is capable of decoding CD-ROM and CD-DA discs according to the prior art. A pickup unit 2 receives reflected light of a laser beam irradiated to a compact disc 1, converts the intensity of the reflected light into a voltage signal representing the intensity value, and supplies the signal to an analog signal processing unit 3. The analog signal processing unit 3 reads out digital data written in the compact disc 1 from the input signal, and outputs, in series, the digital data having a format similar to the given format. The output from the analog signal processing unit 3 is connected to an input of a digital signal processing unit 4, which carries out processing of the digital data input from the analog signal processing unit 3 in accordance with the proper digital data format, CD-ROM format or CD-DA format. The signal processing in the digital signal processing unit 4 maintains compatibility with a digital audio CD system, and includes, for example, demodulation of 14 bit digital data to 8 bit data and code error detection/correction based on Reed-Solomon code. A CD-ROM decoder 5 and a CD-DA decoder 39 respectively provide additional code error correction for the CD-ROM data or CD-DA data fed from the digital signal processing unit 4 and transfer the CD-ROM or CD-DA data, which has substantially no errors, to a host computer. A buffer RAM 6 is connected to the CD-ROM decoder 5 and the CD-DA decoder 39 to temporarily store the CD-ROM or CD-DA data, which has been supplied from the digital signal processing unit 4 to the CD-ROM decoder 5 or the CD-DA decoder 39, for a given period. A control micro computer 7 controls operation of the analog signal processing unit 3, digital signal processing unit 4, CD-ROM decoder 5, and CD-DA decoder 39 in accordance with the operation programs so that each unit carries out the respective processing at the correct time.

Figure 2:
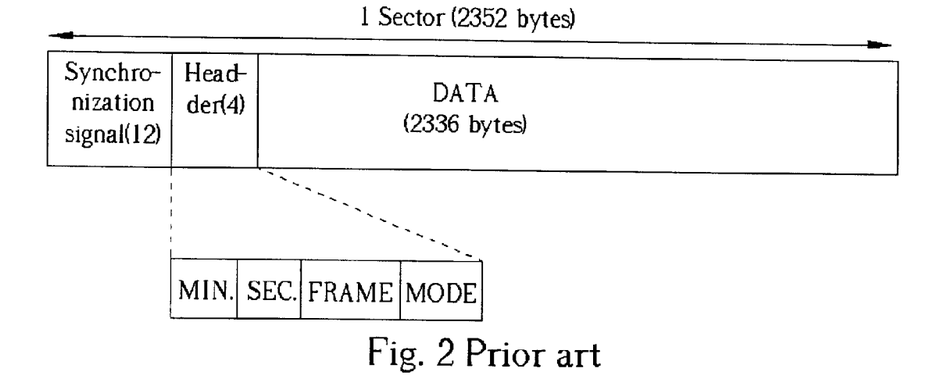
FIG. 2 shows a typical data format for a sector of conventional CD data.

Please refer to FIG. 2. FIG. 2 shows a typical data format for a sector of conventional CD data. The CD data output from the digital signal processing unit 4 shown in FIG. 1 is divided into a number of sectors, and each sector is 2352 bytes and includes a synchronization signal (12 bytes), header (4 bytes) and user data (2336 bytes) as shown in FIG. 2, and as is well known in the art.

Figure 3:
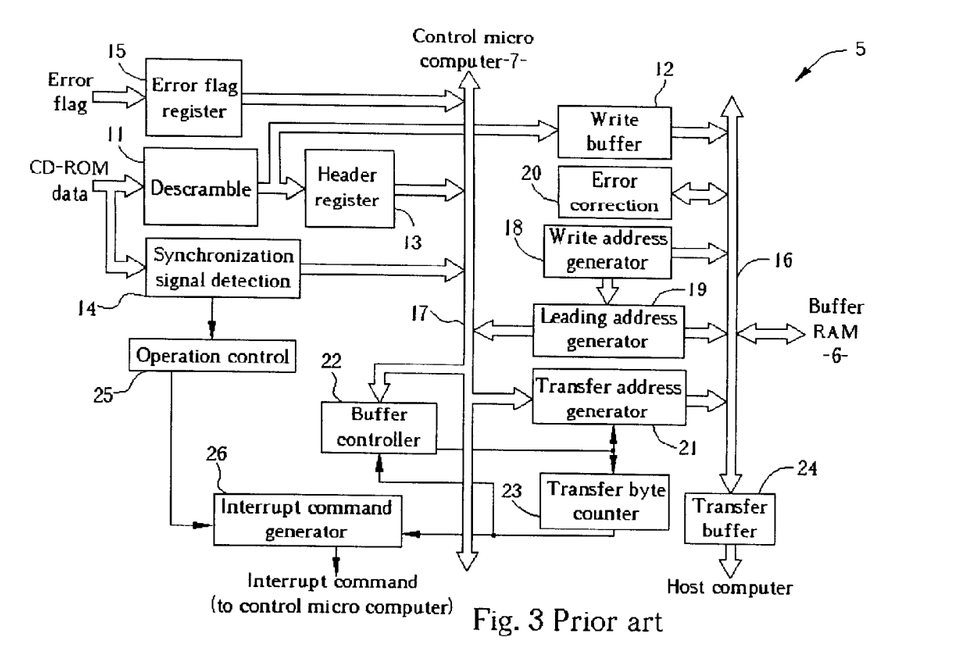
FIG. 3 is a functional block diagram of a conventional CD-ROM decoder.

FIG. 3 is a functional block diagram of the conventional CD-ROM decoder 5. A descramble circuit 11 provides descramble processing for the 2340 bytes of the 2352 bytes (1 sector) of CD ROM data input, disregarding the 12 byte synchronization signal, and outputs data which is recovered to be a given format. A write buffer 12 extracts 2336 bytes of data (hereinafter referred to as user data) from the data output from the descramble circuit 11 and writes the user data through a first data bus 16 into the buffer RAM 6. A header register 13 takes in 4 bytes of the data output from the descramble circuit 11 and transfers the header information via a second data bus 17 to the control micro computer 7. A synchronization signal detection circuit 14 detects a 12 byte synchronization signal assigned to the leader portion of the respective sectors of the input data and supplies a timing signal representing the beginning of the sector's CD-ROM data input to an operation control circuit 25, details of which will be described below. When the synchronization signal is not detected, data showing the detection error is fed to the control micro computer 7 via the second data bus 17. An error flag register 15 extracts an error flag indicating that errors are still left after the error correction by the digital signal processing unit 4 arranged before the CD-ROM decoder 5 and transfers the information via the second data bus 17 to the control micro computer 7.

A write address generator 18 generates a series of addresses at a constant cycling period to designate a write address of the CD-ROM data which is to be written into the buffer RAM 6 from the write buffer 12. A leading address generator 19 receives an address of the buffer RAM 6, to which the leader portion of the respective sectors is to be written, from the address generator 18. After keeping the received addresses until completion of the writing operation for a sector of the CD-ROM data, the leading address generator 19 feeds the addresses to the first data bus 16. The leading addresses are also fed to the control micro computer 7 via the second data bus 17 so as to produce preset data for a transfer address generator 21. An error correction circuit 20 takes in the leading address data via the first data bus 16 and sequentially reads out, based on the address data, the CD-ROM data which was written into the buffer RAM 6. The error correction circuit 20 then detects and corrects a code error on the basis of the error detection code (EDC) and error correction code (ECC), which have been set in the user data. When the data has been subjected to given error correction processing in the above described manner, it is again written into the buffer RAM 6.

The transfer address generator 21 is loaded with the preset data corresponding to the leading address of the buffer RAM 6, at which time the reading out of the CD-ROM data begins. In response to a command from a buffer controller 22, the transfer address generator 21 generates a series of addresses beginning from an address corresponding to the preset data. The generated addresses are fed via the first data bus 16 to the buffer RAM 6 and used for the designation of the readout address of the CD-ROM data which has been subjected to the error correction processing. A transfer byte counter 23 is loaded with preset data representing the CD-ROM data to be read out from the buffer RAM 6 and then decrements (counts down) the preset data value every time a sector of the CD-ROM data is read out from the buffer RAM 6. At the point when a given count is completed, the counter 23 supplies a stop command to the buffer controller 22. A transfer buffer 24 receives, via the first data bus 16, the CD-ROM data which has been read out in accordance with the address generated by the transfer address generator 21 and transfers the data to the host computer. Each preset data loaded on the transfer address generator 21 and transfer byte counter 23, respectively, is generated by the control micro computer 7 based on the leading address fed from, the leading address generator 19 and a transfer command given by the host computer.

The operation control circuit 25 counts the time period taken for the completion of error correction made by the error correction circuit 20, on the basis of a timing signal from the synchronization signal detection circuit 14 and generates another timing signal indicating the completion of the error correction operation. The error correction processing is carried out inside the error correction circuit 20 after taking in a sector of CD-ROM data from the buffer RAM 6, during which the next one sector of CD-ROM data is being written in the buffer RAM 6.

An interrupt command generator 26 receives either the timing signal from the operation control circuit 25 or the stop command from the transfer byte counter 23 and feeds an interrupt command to the control micro computer 7. In response to the interrupt command, the control micro computer 7, which carries out the operation control for the analog signal processing unit 3 and digital signal processing unit 4 on a time sharing basis, suspends the operation which is being carried out at that point and allows the CD-ROM decoder S to perform the next operation. In other words, by interrupting the current operation in response to the interrupt command, the control micro computer 7 may drive the buffer controller 22 to start the data transfer from the buffer RAM 6 to the host computer.

Figure 4:
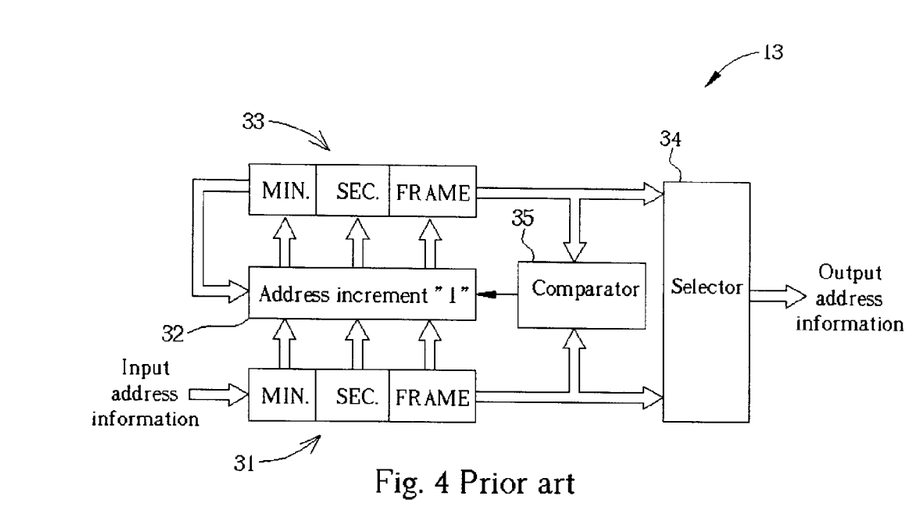
FIG. 4 shows address data judging circuitry located in a header register of the CD-ROM decoder.

Please refer to FIG. 4. FIG. 4 shows address data judging circuitry located in the header register 13 of the CD-ROM decoder 5. The header register includes an input address register 31, an address incrementor 32, an address information register 33, a selector 34, and a comparator 35.

The input address register 31 receives and stores three bytes of address data representing minutes (MIN), seconds (SEC) and frame number (FRAME) from among the four bytes of header information assigned for every sector of the CD-ROM data. The three bytes of address data are extracted by the descramble circuit 11 and supplied to the input address register 31. The value of FRAME data causes an increment of the SEC data every 75 frames, and the value of SEC data causes an increment of the MIN data every 60 seconds (4,500 frames). One frame is equal to one sector (2352 bytes).

The address incrementor 32 reads out address data from either the input address register 31 or the address information register 33 and adds a value of 1 to the address data, which is then supplied to the address information register 33. A value of 1 is successively added to a frame number, and when the frame number reaches 74, it rolls to "0" and increments the SECOND value. The SECOND value is incremented from "0" to "59", and by the next addition of a value "1", the SECOND value returns to "0" and a value "1" is added to the MINUTE value. The MINUTE value is incremented from "0" to "81", and by the next addition of a value "1", it returns to "0".

The address information register 33 receives and stores address information output from the address incrementor 32. When the address data from the address incrementor 32 is taken into the address information register 33, the next address information is supplied to the input address register 31. The selector 34 receives both the address information read out from the input address register 31 and the address information register 33, respectively, and selects one of them for output. This selection is made based on a control pulse supplied by the comparator 35. The comparator 35 also receives both address information output from the input address register 31 and the address information register 33 and compares the two values to determine whether or not these two values coincide. In accordance with the comparison result, the comparator 35 generates a control pulse, which is supplied to the selector 34. When the two values of address information stored in the respective registers 31 and 33 coincide, address data read out from the input address register 31 is selected to be output. On the other hand, when the two addresses do not coincide, address data from the address information register 33 is selected to be output. At the same time, a selection pulse is supplied to the address incrementor 32.

The two address information values stored in the respective registers 31 and 33 coincide, the value from the input address register 31 is taken into the address incrementor 32, and when these two do not coincide, address data from the address information register 33 is taken into the address incrementor 32.

Figure 5:
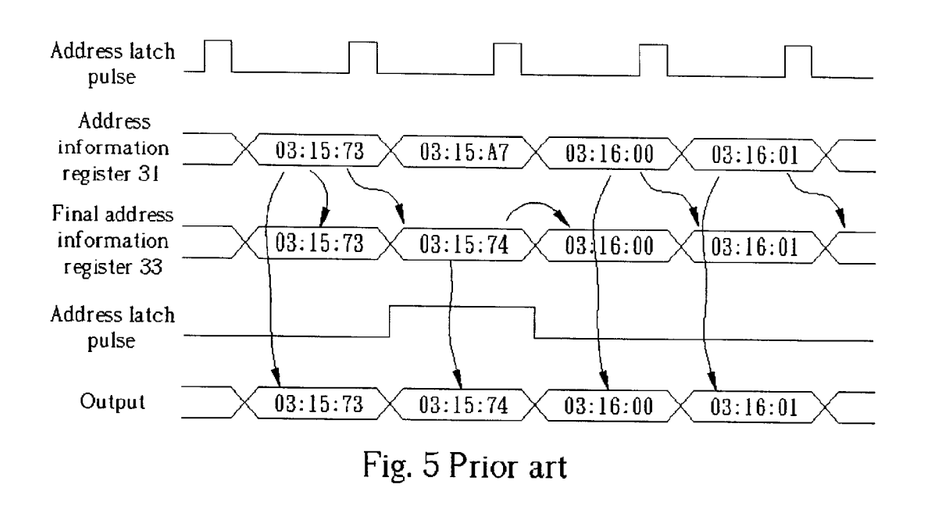
FIG. 5 is a timing diagram showing operation of the address data judging circuitry located in the header register.

Address data stored in the address information register 33 is shifted by one sector from that in the input address register 31 at the same point in time. However, because of the addition of a value "1", the two values of address information stored in the respective registers 31 and 33 must coincide as long as there is no code error. When a code error occurs, data from the input address register 31 becomes discontinuous, while address data stored at the same time in the address information register 33 is still continuous, resulting in differences between the address information in the two registers. For instance, please refer to FIG. 5. FIG. 5 is a timing diagram showing operation of the address data judging circuitry located in the header register 13. As shown in FIG. 5, even if the data value stored in the input address register 31 presents a value of "03:15:A7", which was supposed to be "03:15:74", following a value of "03:13:73" due to a code error, the address information input to the address information register 33 still maintains regularity and presents a correct value of "03:15:74", following a value of "03:15:73". When the address information read out from the respective register 31 and 33 do not coincide, the comparator 35 determines that address data stored in the input address register 31 contains a code error, which makes the selector 34 select and output the address information read out from the address information register 33. Simultaneously, to maintain the regularity of the address data which is to be supplied next from the address incrementor 32 to the address information register 33, the address information in the address information register 33 is taken into the address incrementor 32 instead of the address information from the input address register 31. With reference to FIG. 5 again, in the case that data having a value "03:15:A7" is read out from the input address register 31 due to a code error, address information "03:15:74" stored in the address information register 33 is taken into the address incrementor 32 and a value "1" is added to it. As a result, the correct succeeding address information "03:16:00" is stored in the address information register 33 without losing regularity.

However, there is a shortcoming with the address data judging circuitry of the header register 13 in the CD-ROM decoder 5. As shown in FIG. 5, the first address information read into the input address register 31 is "03:15;73". Since this is address information read from a first sector that the CD-ROM decoder receives, and the address information register 33 has no knowledge of what the first sector address is, the address information register 33 receives the same address information located in the input address register 31. Starting with the second sector, the address information register 33 has knowledge of what the next sector address will be, and the judging circuitry is able to serve its purpose.

Unfortunately, with the first sector, there is no way of knowing if the address information corresponding to the first sector is correct. That is, if address information of the first sector is wrong, then the address information register 33 will contain wrong address information for all subsequent sectors.

Figure 6:
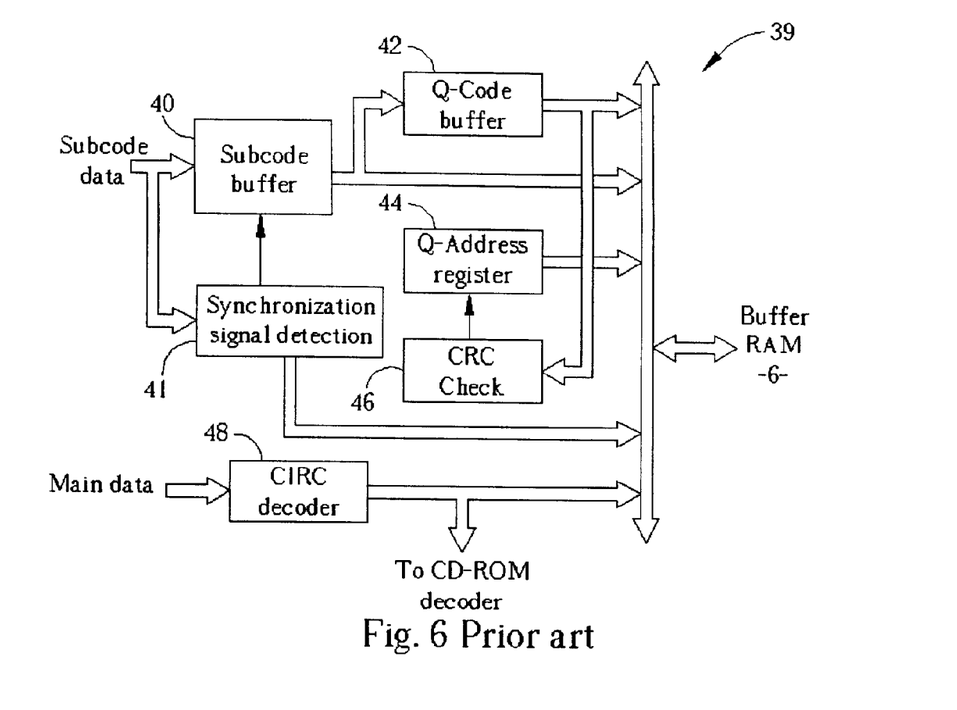
FIG. 6 is a functional block diagram of a conventional CD-DA decoder.

The problem just mentioned is a problem not only in the CD-ROM decoder 5, but in the CD-DA decoder 39 as well. Please refer to FIG. 6. FIG. 6 is a functional block diagram of the conventional CD-DA decoder 39. Main data is fed into a Cross Interleaved Reed-Solomon (CIRC) decoder 48, which decodes the main data and detects any errors present in the main data. Subcode data is first fed into a subcode buffer 40, and a synchronizationsignal detection circuit 41 detects a 2 byte synchronization signal contained in leader portions of the respective sectors of the input subcode data. Q subcode information is then fed from the subcode buffer 40 into a Q-code buffer 42. A cyclic redundancy code (CRC) check circuit 46 is used to check errors of data stored in the Q-code buffer 42. A Q-code address register 44 is used to perform a similar task as the header register 13 in the CD-ROM decoder 5. That is, the Q-code address register 44 also contains address judging circuitry like that shown in FIG. 4. Unfortunately, the address judging circuitry in the CD-DA decoder 39 contains the same problem as the address judging circuitry in the header register 13 of the CD-ROM decoder 5. Namely, if address information contained in a first read sector is not correct, the address information register 33 will have incorrect address information data, and no proper address correction can take place on address information of subsequent sectors.

SUMMARY OF INVENTION

It is therefore a primary objective of the claimed invention to provide a method for using a compact disc decoder to provide correct address information for all sectors read from the compact disc in order to solve the above-mentioned problems.

According to the claimed invention, a method for using a compact disc decoder to correct a code error in digital data read out from a compact disc, which is divided into sectors, is disclosed. The compact disc decoder includes an extracting circuit for extracting address data from the digital data, an error detection circuit for detecting presence of an error in the address data, a correction data generating circuit for receiving the address data and producing correction data, and a selection circuit for selecting address data or correction data. The method comprises using the extracting circuit to extract the address data out of at least one sector read from the compact disc, and using the error detection circuit to read a condition of an input error flag corresponding to the address data of the sector, wherein if the condition of the input error flag indicates that the address data contains an error, then the extracting circuit extracts address data of another sector, and when the input error flag indicates that no error is present in the address data of the sector, the sector is referred to as a first sector, and the selection circuit selects address data of the first sector without referring to address data of any sectors read before the first sector.

It is an advantage of the claimed invention that the compact disc decoder reads the value of the input error flag corresponding to each sector. The input error flag allows the compact disc decoder to immediately know if there is an error in address information data contained in the sector, and to re-read the sector if an error was detected. In this way, address correction is greatly enhanced since errors in address information data are not propagated to subsequent sectors.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 7:
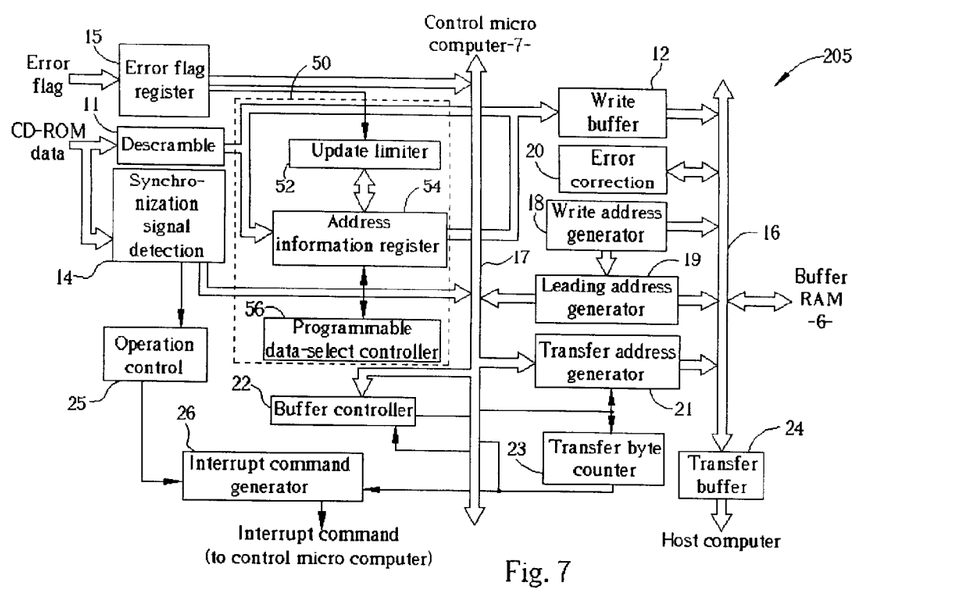
FIG. 7 is a functional block diagram of a CD-ROM decoder according to the present invention.

Please refer to FIG. 7. FIG. 7 is a functional block diagram of a CD-ROM decoder 205 according to the present invention. The CD-ROM decoder 205 of the present invention substitutes for the conventional CD-ROM decoder 5 illustrated in FIG. 3, and same reference numbers will be used for identical parts. The difference between the CD-ROM decoder 5 and the present invention CD-ROM decoder 205 is the present invention uses an address decision circuit 50 instead of the header register 13 used in the prior art CD-ROM decoder 5.

The address decision circuit 50 contains an address information register 54 for receiving sector address information and for outputting correct sector address information, an update limiter 52 for passing error information found in the error flag from the error flag register 15 to the address information register 54, and a programmable data-select controller 56 for helping to control operation of the address information register 54 and the update limiter 52. The error flag register 15 reads the error information from a C2 pointer of the CD-ROM, and generates the corresponding error flag. The error flag sent from the error flag register 15 to the update limiter 52 notifies the update limiter of an error in address information corresponding to a sector being read by the CD-ROM decoder 205. If a value of the error flag indicates an error, the address decision circuit 50 acts accordingly, as will be explained below.

Figure 8:
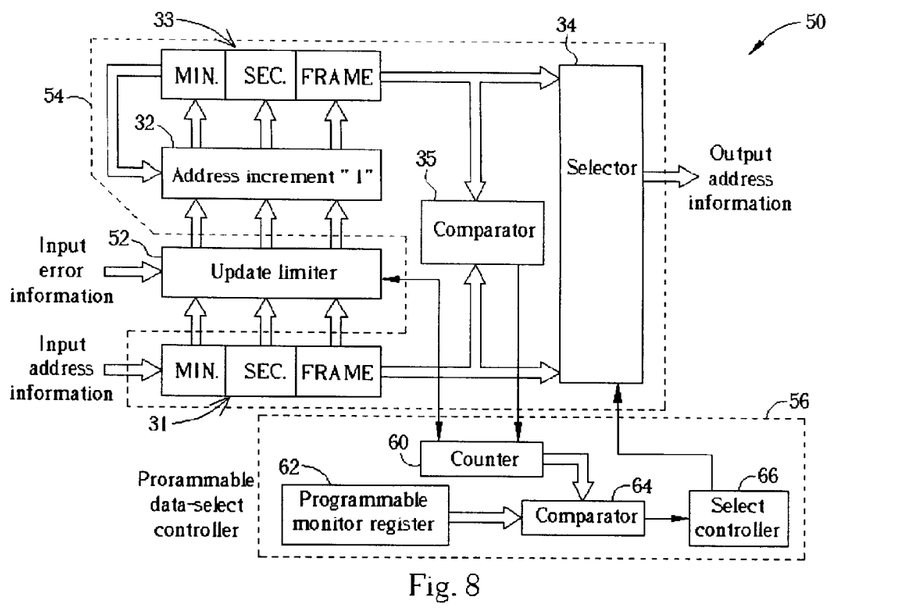
FIG. 8 is a detailed block diagram of an address decision circuit shown in FIG. 7.

Please refer to FIG. 8. FIG. 8 is a detailed block diagram of the address decision circuit 50 shown in FIG. 7. The address decision circuit 50 is similar to the address data judging circuitry located in the header register 13 of the prior art CD-ROM decoder 5, as shown in FIG. 4. In fact, the address information register 54 is nearly identical to the address data judging circuitry used in the prior art. The address information register 54 contains the input address register 31, the address incrementor 32, the address information register 33, the selector 34, and the comparator 35. The functionality of the address information register 54 is nearly identical to that of the address judging circuitry of the prior art. That is, address information is received by the input address register 31 and fed to the address incrementor 32, which in turn increments the address information and sends it to the address information register 33. In fact, the only difference between the address information register 54 and the address judging circuitry of the prior art lies in interaction with the update limiter 52 and the programmable data-select controller 56. As stated earlier, the update limiter 52 receives error information from the error flag register 15 corresponding to each sector that is read from the CD. The update limiter 52 also sends the error information to the programmable data-select controller 56 for control operations.

The programmable data-select controller 56 is used to control the update limiter 52 and the address information register 54, and includes a counter 60 for counting numbers of successive sectors with or without a corresponding error, a programmable monitor register 62 for storing programmed information about how many successive sectors with or without errors are needed to change a state of the address decision circuit 50, a comparator 64 for comparing a value in the counter 60 with a value in the programmable monitor register 62, and a select controller 66 for controlling the selector 34 located in the address information register 54. The programmable data-select controller 56 functions as a state machine for controlling the address decision circuit 50, as will be explained below.

Figure 9:
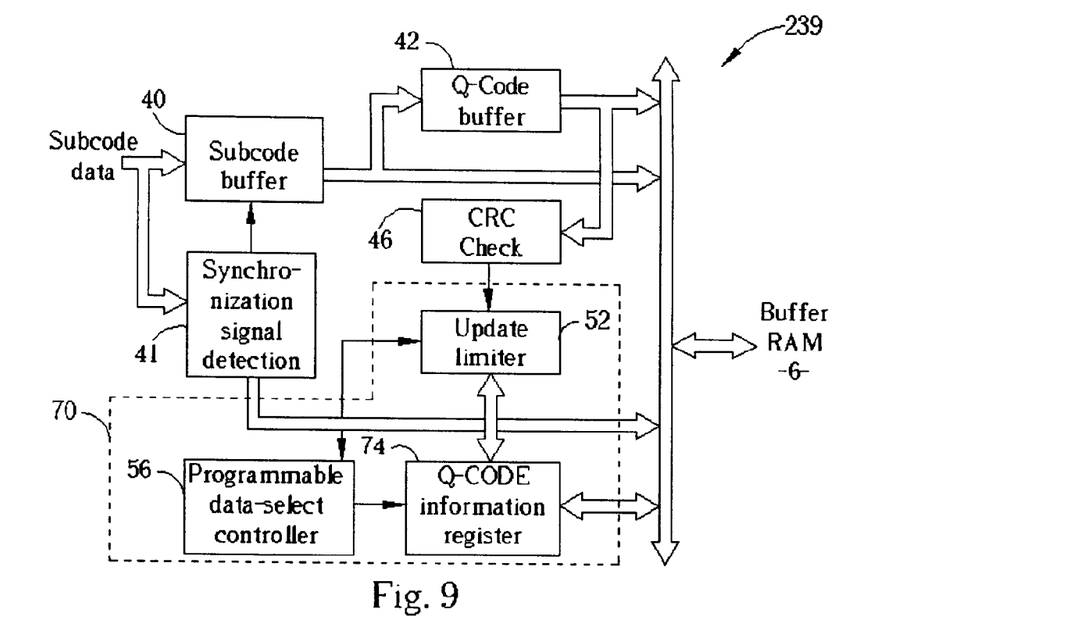
FIG. 9 is a functional block diagram of a present invention CD-DA decoder.

Please refer to FIG. 9. FIG. 9 is a functional block diagram of a present invention CD-DA decoder 239. The CD-DA decoder 239 of the present invention substitutes for the conventional CD-DA decoder 39 illustrated in FIG. 6, and same reference numbers will be used for identical parts. The difference between the CD-DA decoder 39 and the present invention CD-DA decoder 239 is the present invention uses an address decision circuit 70 instead of the Q-code address register 44 used in the prior art CD-DA decoder 39. The function of the address decision circuit 70 used in the CD-DA decoder 239 is nearly identical to the function of the address decision circuit 50 used in the CD-ROM decoder 205, and same reference numbers will be used for identical parts. In addition, the address decision circuit 70 is functionally identical to the address decision circuit 50 of the CD-ROM decoder 205. Each has an update limiter 52 and a programmable data-select controller 56. Moreover, a Q-code information register 74 of the address decision circuit 70 is analogous to the address information register 54 of the address decision circuit 50 that was shown in FIG. 8. With the CD-DA decoder 239, error information is produced from the CRC check circuit 46, and fed to the update limiter 52. As will be explained below, error information is used as input to a state machine that controls the address decision circuit 70 and ensures that proper addresses are used for sectors read from the CD.

Figure 10:
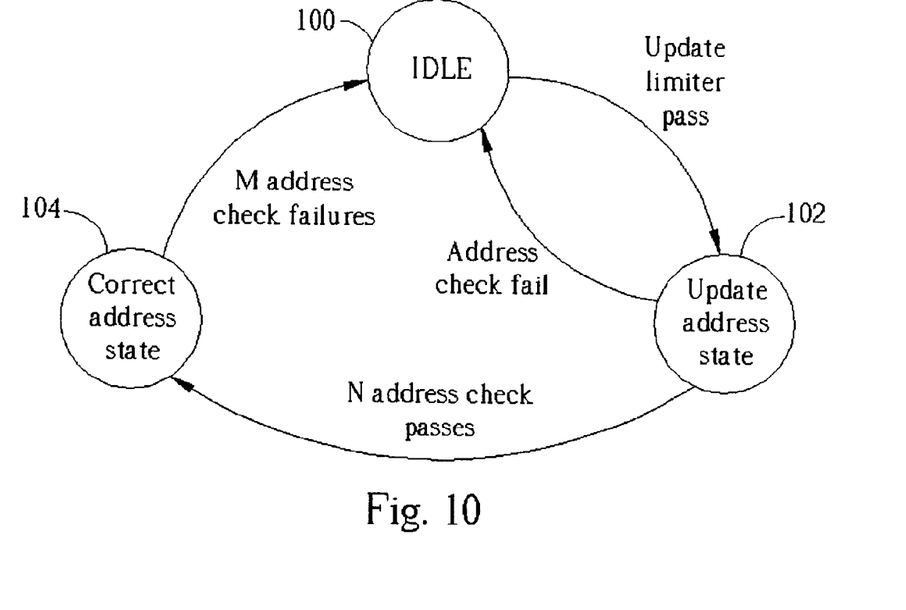
FIG. 10 is a state diagram illustrating control functions of a programmable data-select controller for the CD-ROM decoder and the CD-DA decoder of the present invention.

Please refer to FIG. 10. FIG. 10 is a state diagram illustrating control functions of the programmable data-select controller 56 for the CD-ROM decoder 205 and the CD-DA decoder 239 of the present invention. When performing a read operation on a CD, a first sector that is read from the CD will be referred to as a first sector, even if the sector is located in the middle of the CD. When reading the first sector, the programmable data-select controller 56 will be in an idle state 100. If address information of a sector is successfully read without the presence of an error, the controller 56 then executes an update limiter pass, and advances to an update address state 102. When in the update address state 102, if an address of one sector is read in the presence of a corresponding error signal, the controller 56 executes an address check fail, and returns to the idle state 100. On the other hand, when in the update address state 102, if the N most recent sector addresses are successfully read without an error, the controller 56 executes N address check passes, and advances to a correct address state 104. Finally, the controller 56 will stay in the correct address state 104 unless M address check failures occur for M sectors, in which case the controller will return to the idle state 100. Preferred values of M and N are 2 and 2, although any values can be used according to the present invention. Furthermore, data can be extracted from sectors read from the CD when the controller is in the update address state 102 or the correct address state 104.

Figure 11A:
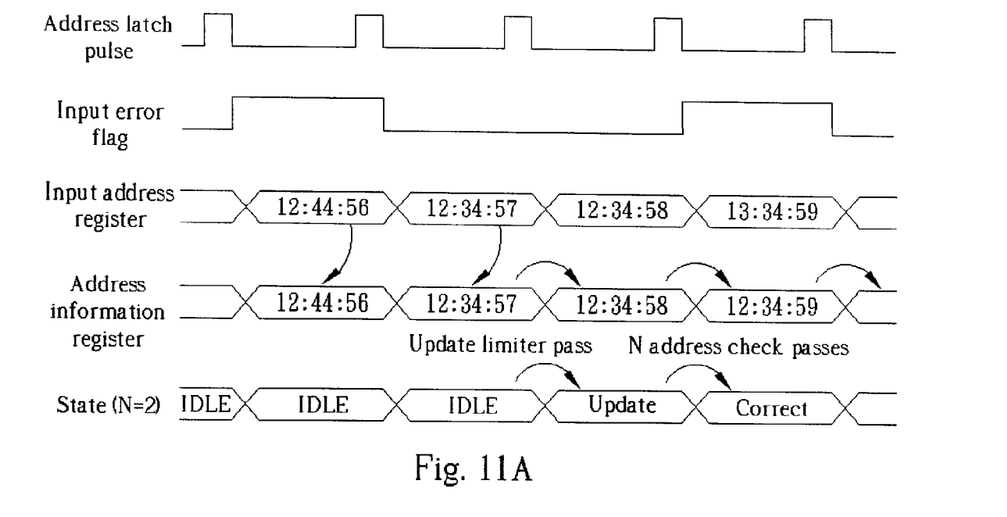
FIGS. 11A and 11B are timing diagrams illustrating control of the CD-ROM decoder and the CD-DA decoder of the present invention.
Figure 11B:
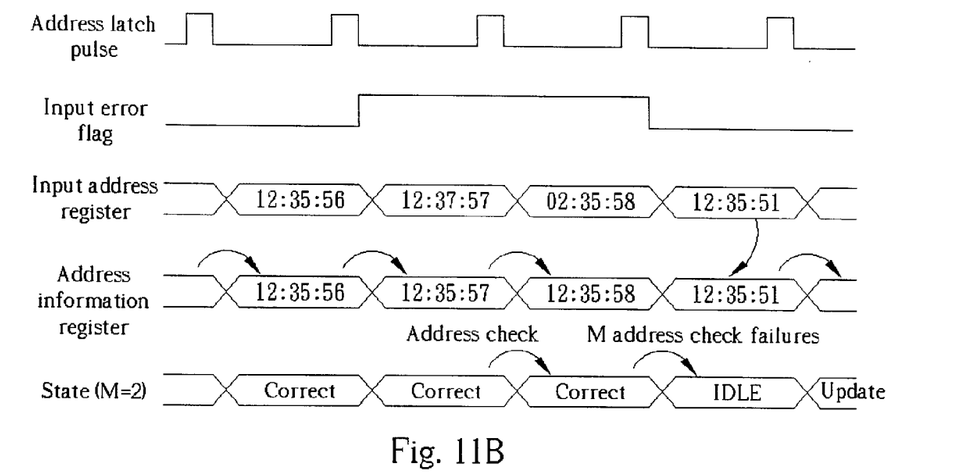

Please refer to FIG. 11A and FIG. 11B with reference to FIG. 8 and FIG. 10. FIGS. 11A and 11B are timing diagrams illustrating control of the CD-ROM decoder 205 and the CD-DA decoder 239 of the present invention. As shown in FIG. 11A, the programmable data-select controller 56 starts off in the idle state 100. Then an address "12:44:56" is read from a first sector and stored in the input address register 31. Since this is the address of the first sector, the address is also stored in the address information register 33. However, error information provided to the update limiter 52 reveals that the input error flag has a value of "1", which indicates an error for the address information of this sector. Therefore, the address read for this sector is not valid, and the controller 56 continues to stay in the idle state 100. Then another address "12:34:57" is read from another sector, which is also considered a first sector because of the idle state 100, and the address is stored in the input address register 31. Since this is the address of the first sector, the address is also stored in the address information register 33. However, for the sector with the address "12:34:57", the input error flag indicates no corresponding error. Therefore, the controller 56 executes an update limiter pass function, increments the address value in the address information register 33, stores a value of 1 in the counter 60, and advances to the update address state 102 for the next sector. Next, the address "12:34:58" is read into the input address register 31 while the controller 56 is in the update address state 102. That means that the address values in the input address register 31 and the address information register 33 are compared by the comparator 35 and one of the values is selected by the selector 34, as was the case with the prior art. Since there is no corresponding error indicated by the input error flag, the counter 60 is incremented to have a value of 2, meaning N (which is equal to 2 in this example) successive sector addresses have been read without error. Therefore, the controller advances to the correct address state 104. The address in the address information register 33 is incremented from "12:34:58" to "12:34:59". Finally, another sector address "13:34:59" is read with a corresponding error indicated by the input error flag. Since the next sector address read in to the input address register 31 is "13:34:59", and not equal to the address in the address information register 33, the selector 34 chooses the address in the address information register 33 to be the correct address for this sector.

As shown in FIG. 11B, the controller starts off in the correct address state 104, and reads in an address "12:35:56"

without a corresponding error. The address value in the address information register 33 is incremented to "12:35:57". Still in the correct address state 104, an address "12:37:57" is read into the input address register 31 with a corresponding error indicated by the input error flag. Since the addresses in the input address register 31 and the address information register 33 are not equal, the selector 34 chooses the address in the address information register 33 to be the correct one. The address value in the address information register 33 is then incremented to "12:35:58". The counter 60 indicates that this is the first sector address read with an error, and M successive sector addresses with errors have not yet been read (M is equal to 2 in this example), so the controller 56 remains in the correct address state 104. Another address "02:35:58" is read into the input address register 31 with a corresponding error indicated by the input error flag. The correct address of "12:35:58" is selected from the address information register 33. Because the counter 60 indicates 2 successive sector addresses have been read with a corresponding error, the controller switches to the idle state 100. Finally, a new first sector address of "12:35:51" is read into the input address register 31 and also copied into the address information register 33. Since there was no corresponding error indicated by the input error flag, the controller advances to the update address state 102 for the next state.

In summary, the present invention is similar to the prior art, but also has the added advantage of using the input error flag to indicate the validity of a sector address. This identifies an error in a sector address immediately when it happens, even if the error occurs in the address of the first sector. Therefore, unlike the prior art, an error of the first sector address will not be propagated to subsequent sectors. Furthermore, the address decision circuits 50 and 70 are used to respectively control the CD-ROM decoder 205 and the CD-DA decoder 239 according to a status of the input error flag and numbers of successive sector addresses with or without an error. Furthermore, just as with the prior art, the comparator 35 and selector 34 are still used in the present invention to choose correct values from the input address register 31 or the address information register 33. As a result, the present invention retains all advantages of the prior art, while at the same time using values in the input error flag to better identify sector addresses that contain errors.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for using a compact disc decoder to correct a code error in digital data read out from a compact disc which is divided into sectors, the compact disc decoder comprising:

an extracting circuit for extracting address data from the digital data;

an error detection circuit for detecting presence of an error in the address data;

a correction data generating circuit for receiving the address data and producing correction data; and a selection circuit for selecting address data or correction data;

the method comprising steps in the following order:

a) using the extracting circuit to extract the address data out of at least one sector read from the compact disc; and b) using the error detection circuit to read a condition of an input error flag corresponding to the address data of the sector, wherein if the condition of the input error flag indicates that the address data contains an error, then the extracting circuit extracts address data of another sector, and when the input error flag indicates that no error is present in the address data of the sector, the sector is referred to as a first sector, and the selection circuit selects address data of the first sector without referring to address data of any sectors read before the first sector.

2. The method of claim 1 further comprising a following step:

c) using the correction data generating circuit to receive the address data of the first sector and to produce correction data by estimating address data in at least one sector following the first sector.

3. The method of claim 2 further comprising a following step:

d) using the error detection circuit to detect a presence of an error in the address data for each of the sectors read from the compact disc.

4. The method of claim 3 further comprising a following step:

e) using the selection circuit to receive the address data and the correction data from the correction data generating circuit and to select and output the correction data instead of the address data when errors contained by sectors following the first sector are detected by the error detection circuit.

5. The method of claim 1 wherein the compact disc decoder further comprises a counter, the method further comprising using the counter to count successive sectors whose address data is extracted without detection of an error by the error detection circuit, and using the counter to count successive sectors whose address data is extracted with detection of a corresponding error by the error detection circuit.

6. The method of claim 5 wherein before the address data of the first sector is extracted, the compact disc decoder is in an idle state, and if the input error flag indicates no error in the address data of the first sector, the method further comprises changing the compact disc decoder from the idle state to an update address state.

7. The method of claim 6 further comprising when the compact disc decoder is in the update address state, detecting an error in address data of one sector changes the state of the compact disc decoder from the update address state back to the idle state.

8. The method of claim 6 further comprising when the compact disc decoder is in the update address state, the counter counting a first predetermined number of successive sectors whose address data is extracted without detection of an error by the error detection circuit changes the state of the compact disc decoder from the update address state to a correct address state.

9. The method of claim 8 further comprising when the compact disc decoder is in the correct address state, the counter counting a second predetermined number of successive sectors whose address data is extracted with detection of a corresponding error by the error detection circuit changes the state of the compact disc decoder from the correct address state to the idle state.

10. A compact disc decoder in a compact disc drive for correcting a code error in digital data read out from a compact disc which is divided into sectors, the compact disc decoder comprising:

an extracting circuit for extracting address data from the digital data of at least one sector read from the compact disc;

a correction data generating circuit for receiving the address data and producing correction data;

a selection circuit for selecting address data or correction data; and an error detection circuit for detecting presence of an error in the address data, and for reading a condition of an input error flag corresponding to the address data of the sector, wherein if the condition of the input error flag indicates that the address data contains an error, then the extracting circuit extracts address data of another sector, and when the input error flag indicates that no error is present in the address data of the sector, the sector is referred to as a first sector, and the selection circuit selects address data of the first sector without referring to address data of any sectors read before the first sector.

* * * * *